(12) United States Patent
Kannou et al.

(10) Patent No.: US 10,995,845 B2
(45) Date of Patent: May 4, 2021

(54) ROTARY ACTUATOR

(71) Applicant: DENSO CORPORATION, Kariya (JP)

(72) Inventors: Fumiya Kannou, Kariya (JP); Hiroyuki Kado, Kariya (JP); Mikine Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/847,835

(22) Filed: Apr. 14, 2020

(65) Prior Publication Data
US 2020/0332879 A1 Oct. 22, 2020

(30) Foreign Application Priority Data

Apr. 16, 2019 (JP) .............................. JP2019-077987

(51) Int. Cl.
| | |
|---|---|
| *F16H 57/028* | (2012.01) |
| *F16H 63/34* | (2006.01) |
| *F16H 57/02* | (2012.01) |
| *F16H 63/00* | (2006.01) |
| *F16H 63/30* | (2006.01) |

(52) U.S. Cl.
CPC ....... *F16H 57/028* (2013.01); *F16H 63/3466* (2013.01); *F16H 2057/02026* (2013.01); *F16H 2063/005* (2013.01); *F16H 2063/3079* (2013.01)

(58) Field of Classification Search
CPC .............. F16H 57/028; F16H 63/3466; F16H 2057/02026; F16H 2063/005; F16H 2063/3079
See application file for complete search history.

(56) References Cited

U.S. PATENT DOCUMENTS

| | | | |
|---|---|---|---|
| 2010/0170355 A1* | 7/2010 | Kume | ..................... F16H 61/32 74/63 |
| 2013/0193812 A1 | 8/2013 | Oishi | |
| 2018/0145558 A1* | 5/2018 | Gilmore | .................. H02K 7/06 |
| 2019/0229588 A1 | 7/2019 | Takahashi et al. | |

FOREIGN PATENT DOCUMENTS

| | | |
|---|---|---|
| JP | 2016-102515 | 6/2016 |
| JP | 2017-163723 | 9/2017 |

OTHER PUBLICATIONS

U.S. Appl. No. 16/847,953, to Kume, et al., entitled: "Rotary Actuator", filed Apr. 14, 2020 (18 pages).
U.S. Appl. No. 16/847,974, to Kannou, et al., entitled: "Rotary Actuator", filed Apr. 14, 2020 (22 pages).
U.S. Appl. No. 16/847,989, to Kume, et al., entitled: "Rotary Actuator", filed Apr. 14, 2020 (20 pages).
U.S. Appl. No. 16/847,788 to Kume, et al., entitled: "Rotary Actuator", filed Apr. 14, 2020 (22 pages).

(Continued)

*Primary Examiner* — Vicky A Johnson
(74) *Attorney, Agent, or Firm* — Nixon & Vanderhye P.C.

(57) ABSTRACT

A rotary actuator is used in a shift-by-wire system for a vehicle. The rotary actuator includes a motor, a controller, a housing, and a biasing member. The controller controls the motor. The housing supports a rotor assembly of the motor and holds the controller. The biasing member biases the rotor assembly in an axial direction to eliminate a thrust movement gap between the rotor assembly and the housing.

3 Claims, 6 Drawing Sheets

(56) References Cited

OTHER PUBLICATIONS

U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).

* cited by examiner

ROTARY ACTUATOR

CROSS REFERENCE TO RELATED APPLICATION

This application is based on Japanese Patent Application No. 2019-077987 filed on Apr. 16, 2019, the disclosure of which is incorporated herein by reference in its entirety.

TECHNICAL FIELD

The present disclosure relates to a rotary actuator.

BACKGROUND

Conventionally, a rotary actuator used as a driving unit for a shift-by-wire system for a vehicle has been known. For example, an electromechanical integrated rotary actuator in which an operating unit including a motor and a controller for controlling the motor are integrally formed has been known. The rotor of the motor constitutes a rotor assembly together with a bearing whose inner ring is press-fitted into a motor shaft. The housing supports the rotor assembly and holds a control board of the controller.

SUMMARY

One aspect of the present disclosure is a rotary actuator used in a shift-by-wire system for a vehicle. The rotary actuator includes a motor, a controller, a housing, and a biasing member. The controller controls the motor. The housing supports a rotor assembly of the motor and holds the controller. The biasing member biases the rotor assembly in an axial direction to eliminate a thrust movement gap between the rotor assembly and the housing.

DETAILED DESCRIPTION

Figure 1:
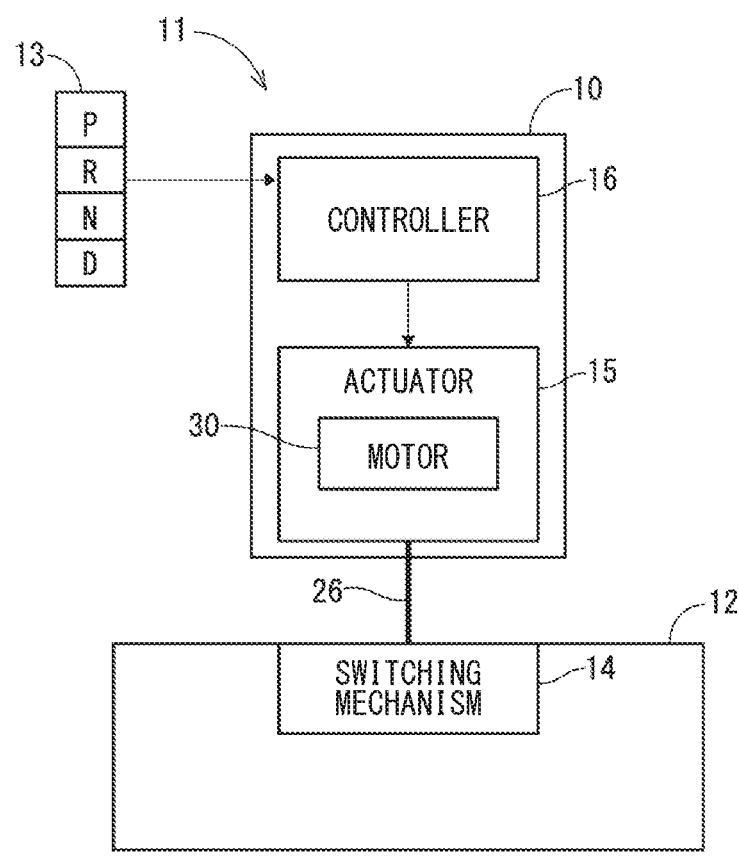
FIG. 1 is a schematic diagram showing a shift-by-wire system to which a rotary actuator according to a first embodiment is applied.

Hereinafter, a plurality of embodiments of a rotary actuator (hereinafter, actuator) will be described with reference to the drawings. In the embodiments, substantially the same components are denoted by the same reference numerals and description thereof is omitted.

To begin with, a relevant technology will be discussed first only for understanding the embodiments described below. In a rotary actuator, a rotor assembly vibrates in an axial direction due to motor operation or vehicle vibration, and sometimes the rotor assembly resonates. For this reason, a load due to vibration and resonance is transferred to other components through a housing, which may cause damages to the components such as wear and disconnection.

The present disclosure has been provided in view of the above, and a rotary actuator that can suppress damages to components will be presented as the following embodiments.

As described above, one aspect of the present disclosure is a rotary actuator used in a shift-by-wire system for a vehicle. The rotary actuator includes a motor, a controller, a housing, and a biasing member. The controller controls the motor. The housing supports a rotor assembly of the motor and holds the controller. The biasing member biases the rotor assembly in an axial direction to eliminate a thrust movement gap between the rotor assembly and the housing.

By eliminating the thrust movement gap between the rotor assembly and the housing by the biasing member, generation of vibration and resonance of the rotor assembly can be suppressed. Therefore, wear of components or malfunctions such as disconnection of the components due to the vibration and resonance can be suppressed.

First Embodiment

In this embodiment, an actuator is used as a driver of a shift-by-wire system for a vehicle.
(Shift-by-Wire System)

The configuration of the shift-by-wire system will be described with reference to FIGS. 1 and 2. As shown in FIG. 1, the shift-by-wire system 11 includes a shift operation device 13 that outputs an instruction (i.e., a command signal) to designate a shift range to the transmission 12 and an actuator 10 that operates a shift range switching mechanism 14 of the transmission 12. The actuator 10 includes an operating unit 15 that has a motor 30 and a controller 16 that controls the motor 30 in response to a shift range instruction signal.

Figure 2:
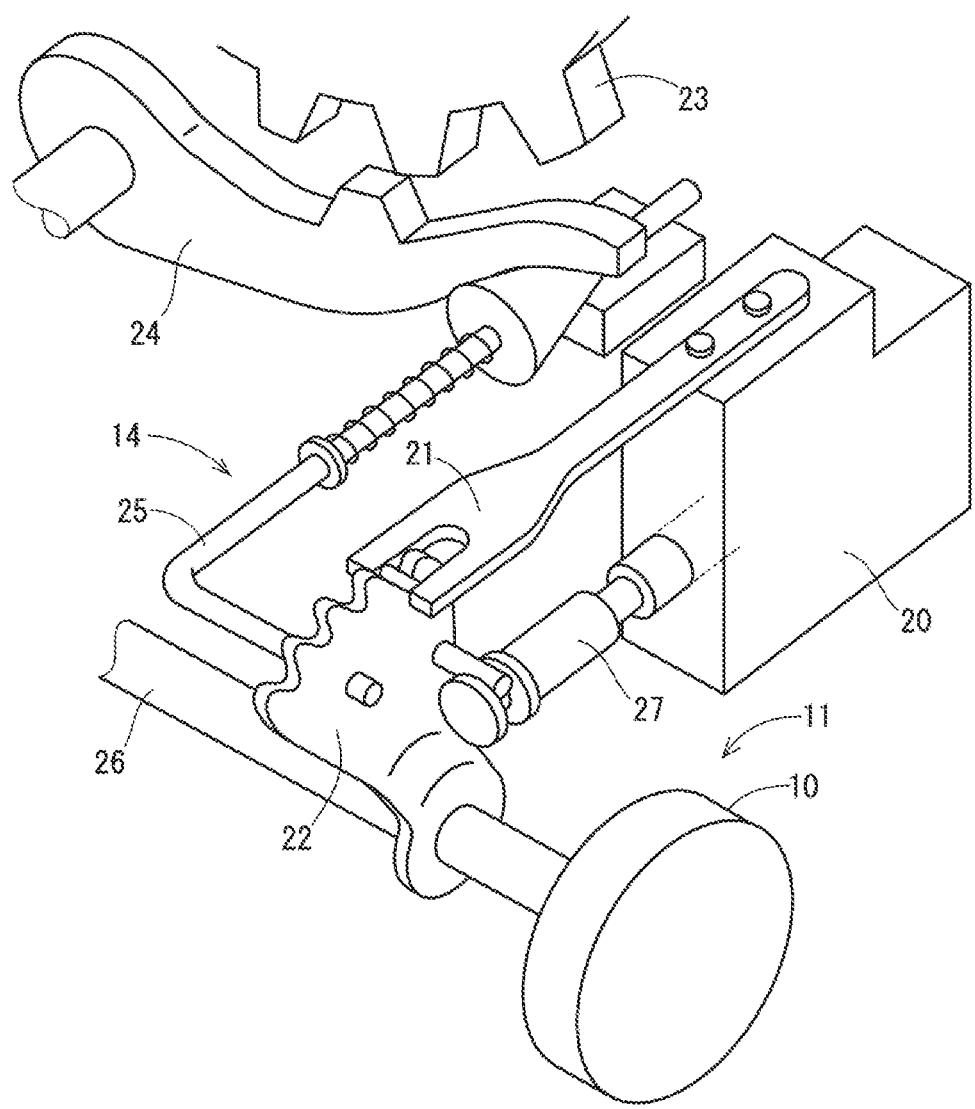
FIG. 2 is a diagram illustrating a shift range switching mechanism of FIG. 1.

As shown in FIG. 2, the shift range switching mechanism 14 includes a range switching valve 20, a detent spring 21 and a detent lever 22, a park pole 24, and a manual shaft 26. The range switching valve 20 controls a supply of hydraulic pressure to a hydraulic operating mechanism in the transmission 12 (see FIG. 1). The detent spring 21 and a detent lever 22 are configured to keep a shift range. The park rod 25 is configured to prevent an output shaft from rotating by fitting the park pole 24 into a park gear 23 of the output shaft of the transmission 12 when the shift range is switched to a parking range. The manual shaft 26 rotates together with the detent lever 22.

The shift range switching mechanism 14 rotates the detent lever 22 together with the manual shaft 26 to move a valve body 27 and the park rod 25 of the range switching valve 20 connected to the detent lever 22 to a position corresponding to a target shift range. In the shift-by-wire system 11, the actuator 10 is connected to the manual shaft 26 in order to perform the shift range change electrically.
(Actuator)

Figure 3:
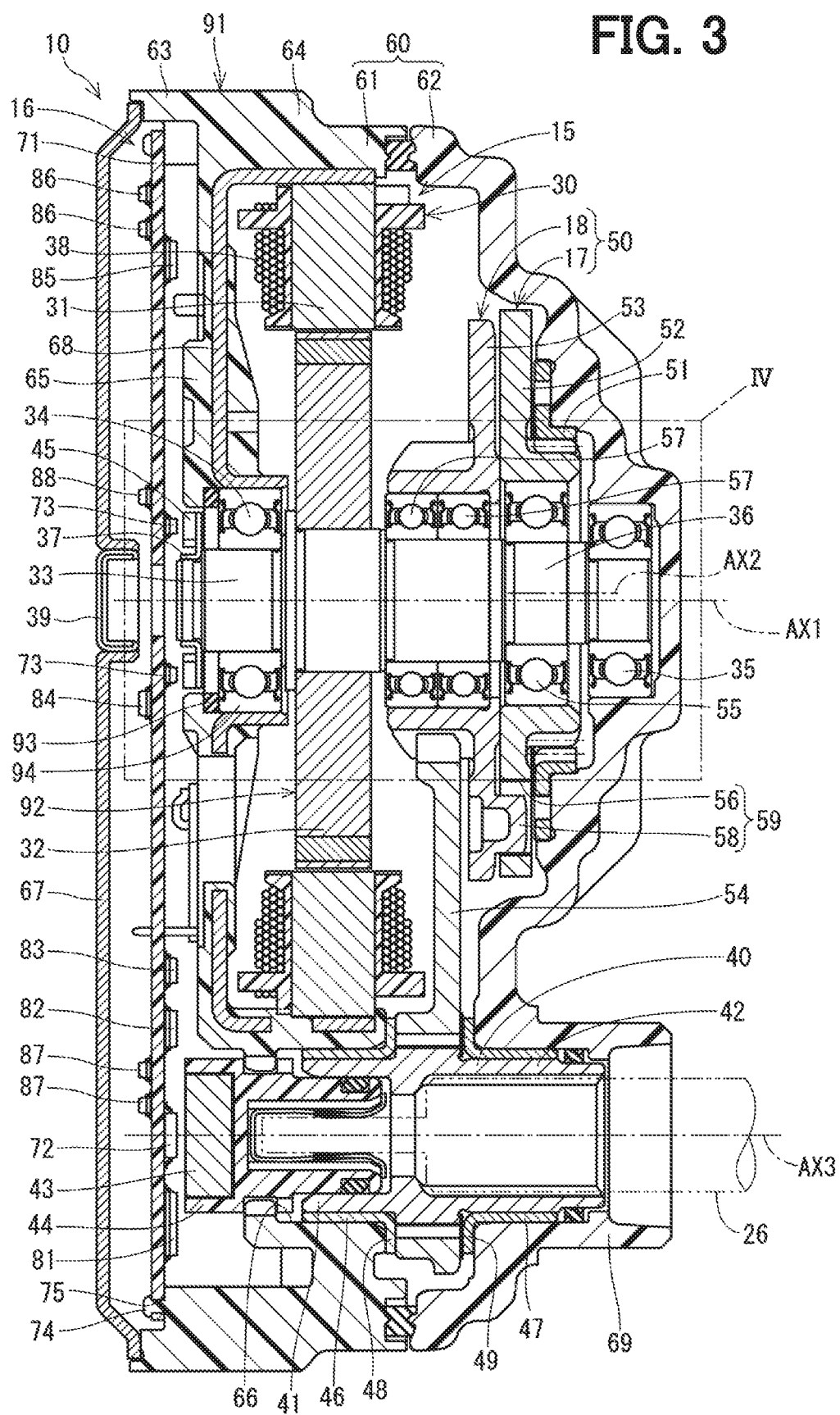
FIG. 3 is a cross-sectional view of the rotary actuator according to the first embodiment.

Next, the configuration of the actuator 10 will be described. As shown in FIG. 3, the actuator 10 is an electromechanical integrated actuator having the operating unit 15 and the controller 16 in a housing 91.

The housing 91 includes a case 60 and a plate cover 67. The case 60 includes a cylindrical upper case 61 and a cup-shaped lower case 62. A partition 65 is formed between one end 63 and the other end 64 of the upper case 61. A control substrate 71 is provided inside of the one end 63. The control substrate 71 is covered by a plate cover 67 provided at an opening of the one end 63, thereby ensuring shielding for the control substrate 71. The lower case 62 is attached to the other end portion 64. The lower case portion 62 includes a cylindrical protruding portion 69 that protrudes away from the upper case 61. The manual shaft 26 is inserted into the cylindrical protrusion 69.

The operating unit 15 includes a motor 30 as a power source, an output shaft 40 disposed parallel to the motor 30, and a speed reducer 50 that reduces the rotational speed of the motor 30 and transmits the rotation to the output shaft 40.

The motor 30 includes a stator 31 press-fitted into, and fixed to, a plate case 68 at the other end 64, a rotor 32 provided inside the stator 31, and a motor shaft 33 that rotates about a rotation axis AX1 together with the rotor 32. The motor shaft 33 is rotatably supported by both a bearing 34 disposed in the plate case 68 and a bearing 35 disposed in the lower case portion 62. Further, the motor shaft 33 has an eccentric portion 36 eccentric with the rotation axis AX1 at a position on a side of the rotor 32 close to the lower case portion 62. The motor 30 is able to rotate bidirectionally by controlling a current supplied to the three-phase winding 38 by the controller 16 and is also able to stop at desired rotational positions. A plug 39 is attached to a through hole of the plate cover 67. If a failure occurs, the motor shaft 33 can be forcibly rotated manually after detaching the plug 39.

The speed reducer 50 has a first speed-reducing portion 17 including a ring gear 51 and a sun gear 52 and a second speed-reducing portion 18 including a drive gear 53 and a driven gear 54 as parallel shafts type gears. The ring gear 51 is coaxially disposed with the rotation axis AX1. The sun gear 52 is rotatably supported about the eccentric axis AX2 by a bearing 55 that is fitted into the eccentric portion 36. The sun gear 52 meshes with, and fits snugly inside, the ring gear 51. When the motor shaft 33 rotates, the sun gear 52 performs planetary motion in which the sun gear 52 revolves around the rotation axis AX1 and rotates about the eccentric axis AX2. At this time, the rotational speed of the sun gear 52 is reduced relative to the rotational speed of the motor shaft 33. The sun gear 52 has a hole 56 for rotation transmission.

The drive gear 53 is provided on the rotation axis AX1 and is rotatably supported about the rotation axis AX1 by a bearing 57 fitted into the motor shaft 33. Further, the drive gear 53 has a protrusion 58 for rotation transmission that is inserted into the hole 56. The rotation of the sun gear 52 is transmitted to the drive gear 53 through engagement between the hole 56 and the protrusion 58. The hole 56 and the protrusion 58 constitute a transmission mechanism 59. The driven gear 54 is provided on the rotation axis AX3 which is parallel to the rotation axis AX1 and coaxial with the cylindrical protrusion 69. The driven gear 54 meshes with the drive gear 53 to circumscribe the drive gear 53. When the drive gear 53 rotates about the rotation axis AX1, the driven gear 54 rotates about the rotation axis AX3. At this time, the rotational speed of the driven gear 54 is reduced relative to the rotational speed of the drive gear 53.

The output shaft 40 has a cylindrical shape, and is provided coaxially with the rotation axis AX3. The partition 65 has a through support hole 66 coaxial with the rotation axis AX3. The output shaft 40 is rotatably supported about the rotation axis AX3 by a first flanged bush 46 fitted into the through support hole 66 and a second flanged bush 47 fitted inside the cylindrical protrusion 69. The driven gear 54 is a separate component from the output shaft 40, is fitted outwardly to the output shaft 40, and is connected to the output shaft 40 to transmit rotation. The manual shaft 26 is inserted into the output shaft 40, and is coupled to the output shaft 40 through, for example, spline fitting so as to transmit rotation.

One end 41 of the output shaft 40 is rotatably supported by the first flanged bush 46. The other end 42 of the output shaft 40 is rotatably supported by the second flanged bush 47. The driven gear 54 is supported in the axial direction by being clamped between a first flange portion 48 of the first flanged bush 46 and a second flange portion 49 of the second flanged bush 47. In another embodiment, the driven gear 54 may be supported in the axial direction by being clamped between a pair of supporting portions such as the case 60 and another plate.

The controller 16 includes a plurality of electronic components for controlling the motor 30, the control board 71 on which the electronic components are implemented, an output shaft position detection sensor 72 implemented on the control board 71, and a motor position detection sensor 73 implemented on the control board 71. The control board 71 has a plurality of outer circumferential fixing portions 75 fixed to the partition 65 by a heat caulking portion at an outer circumferential surface of the control board 71.

The plurality of electronic components include a microcomputer 81, a MOSFET 82, a capacitor 83, a diode 84, an ASIC 85, an inductor 86, a resistor 87, a capacitor chip 88, and the like. The microcomputer 81 performs various types of a computation based on detection signals from the output shaft position detection sensor 72 and the motor position detection sensor 73, for example. The MOSFET 82 performs a switching operation based on a driving signal from the microcomputer 81 to switch energization to the three-phase winding 38. The capacitor 83 smoothens a power supplied from a power supply (not illustrated) and prevents noise propagation arising due to the switching operation by the MOSFET 82. The capacitor 83 constitutes a filter circuit together with the inductor 86. The ASIC 85 is an IC chip that performs a specific process at a high speed.

The output shaft position detection sensor 72 is disposed on the control board 71 at a position facing the magnet 43. The magnet 43 is fixed to a holder 44 attached to the output shaft 40. The output shaft position detection sensor 72 detects a rotational position of the output shaft 40 and the manual shaft 26 rotating together with the output shaft 40 by detecting a magnetic flux generated by the magnet 43.

The motor position detection sensor 73 is disposed on the control board 71 at a position facing the magnet 45. The magnet 45 is fixed to a holder 37 attached to the motor shaft 33. The motor position detection sensor 73 detects a rotational position of the motor shaft 33 and the rotor 32 by detecting a magnetic flux generated by the magnet 45.

(Biasing Member)

Figure 4:
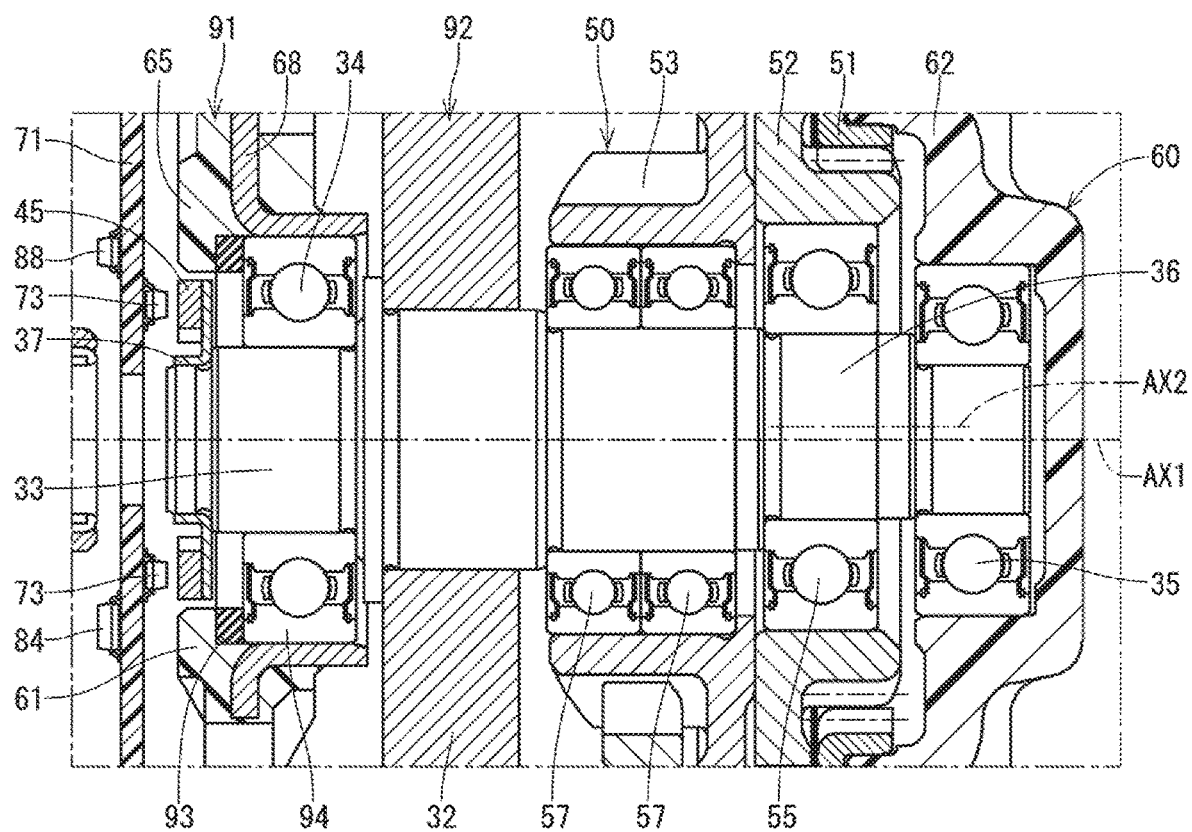
FIG. 4 is a partially enlarged cross-section view of IV part in FIG. 3.

Next, the configurations of the rotor assembly 92 and its peripheral components will be described. As shown in FIG. 4, the rotor assembly 92 includes a rotor 32 and bearings 34, 35 that rotatably support the motor shaft 33 of the rotor 32. The actuator 10 further includes an elastic body 93 as a biasing member.

The biasing member 93 biases the rotor assembly 92 in the axial direction to eliminate a thrust movement gap between the rotor assembly 92 and the housing 91. The thrust movement gap is defined as a gap between the rotor assembly 92 and the housing 91 that allows the rotor assembly 92 to relatively move in the axial direction.

In the first embodiment, the elastic body 93 is disposed on a side of the rotor assembly 92 close to the control board 71. The elastic body 93 is an annular member made of rubber, and is provided between an outer ring 94 of the bearing 34 and the partition 65 of the upper case 61. The elastic body 93 biases the rotor assembly 92 toward the one side of the axial directions, i.e., in a direction away from the control board 71 (the right side in FIG. 4).

The biasing direction of the elastic body 93 is parallel to the axial direction, and the face width direction of each gear of the speed reducer 50 is also parallel to the axial direction. That is, the biasing direction of the elastic body 93 is parallel to the face width direction of each gear of the speed reducer 50. Thus, tooth faces of each gear of the speed reducer 50 are not pressed against each other by the elastic body 93 biasing the rotor assembly 92.

As described above, in the first embodiment, the actuator 10 includes the motor 30, the control unit 16 that controls the motor 30, the housing 91 that supports the rotor assembly 92 of the motor 30 and holds the controller 16, and the elastic body 93 that biases the rotor assembly 92 in the axial direction to eliminate the thrust movement gap between the rotor assembly 92 and the housing 91.

In this way, by eliminating the thrust movement gap between the rotor assembly 92 and the housing 91, vibration and resonance of the rotor assembly 92 can be reduced. Thereby, transfer of the impact due to the vibration and the resonance to other components through the housing 91 can be inhibited. Therefore, the other components can be inhibited from being worn or damaged such as disconnection of the components. In particular, since transfer of the impact to the control board 71 is effectively prevented, a decrease in durability of the electronic components 81 to 88 and the solder mounted on the control board 71 can be avoided.

In the first embodiment, the biasing direction of the elastic body 93 is parallel to the face width direction of each gear of the speed reducer 50. Thus, tooth faces of each gear of the speed reducer 50 are not pressed against each other by the elastic body 93 biasing the rotor assembly 92. Therefore, damage to the components can be avoided without decreasing the gear efficiency of the speed reducer 50.

In the first embodiment, the biasing member is the elastic body 93 that biases the rotor assembly 92 toward the one side of the axial direction. As a result, a biasing load on the rotor assembly 92 can be easily generated. Further, prevention of the damage to the components can be achieved by a single means (i.e., the elastic body 93), and thus an increase in the size of the device can be avoided. Further, unlike using a solenoid to bias the rotor assembly 92, a power supply is not required.

In the first embodiment, the rotor assembly 92 includes the rotor 32 and the bearings 34, 35 that rotatably support the rotor 32. The elastic body 93 is disposed between the outer ring 94 of the bearing 34 and the partition 65 of the upper case 61. Since the elastic body 93 is provided between the members that do not rotate, wear of the elastic body 93 can be suppressed.

Second Embodiment

Figure 5:
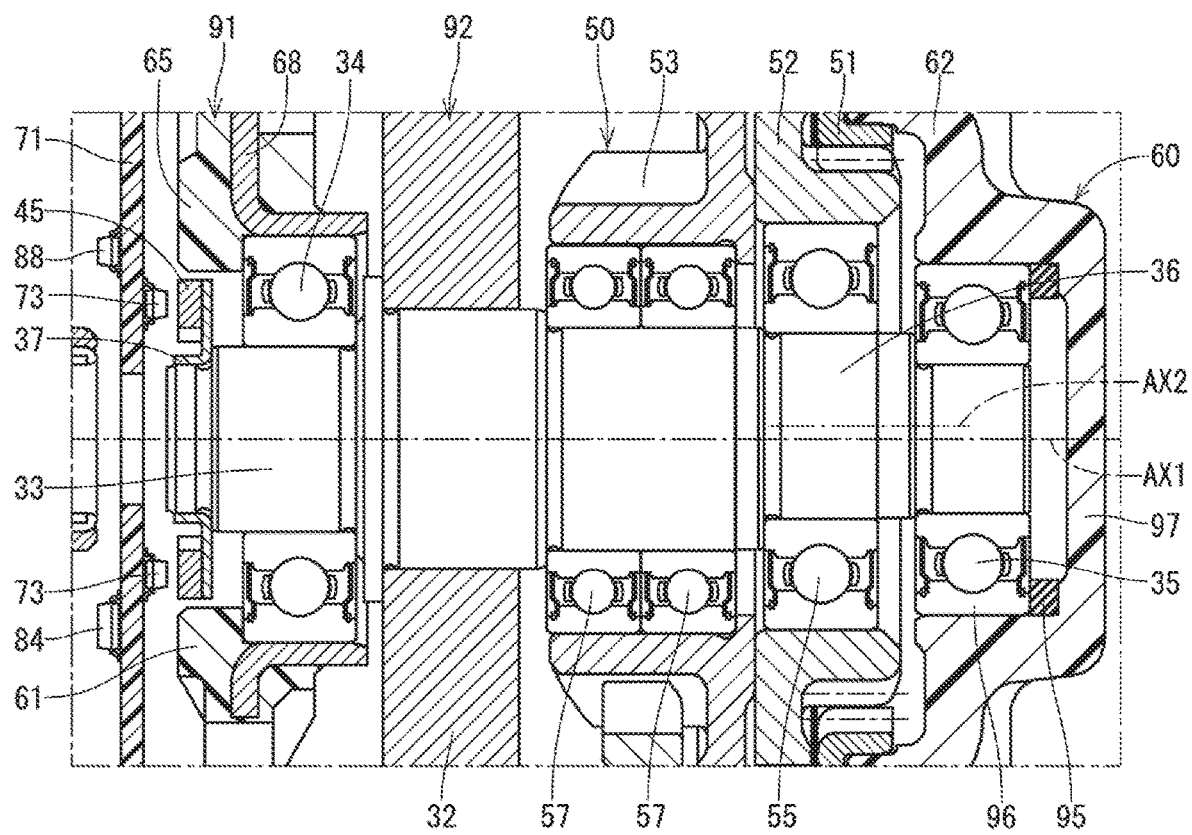
FIG. 5 is a partially enlarged cross-sectional view of a rotary actuator according to a second embodiment.

In the second embodiment, as shown in FIG. 5, the actuator 10 includes an elastic body 95 as a biasing member. The elastic body 95 is disposed on a side of the rotor assembly 92 opposite to the control board 71. The elastic body 95 is an annular member made of rubber, and is provided between the outer ring 96 of the bearing 35 and a bottom 97 of the lower case 62. The elastic body 95 biases the rotor assembly 92 toward the other side of the axial direction to eliminate a thrust movement gap between the rotor assembly 92 and the housing 91. In other words, the elastic body 95 biases the rotor assembly 92 toward the control board 71.

As described above, the elastic body 95 biases the rotor assembly 92 toward the other side of the other axial direction. Even so, by eliminating the thrust movement gap between the rotor assembly 92 and the housing 91 by the elastic body 95, the same advantages as in the first embodiment can be obtained. Further, since the biasing direction is not limited to either one side of the axial direction, the degree of freedom of the device structure is improved.

Third Embodiment

Figure 6:
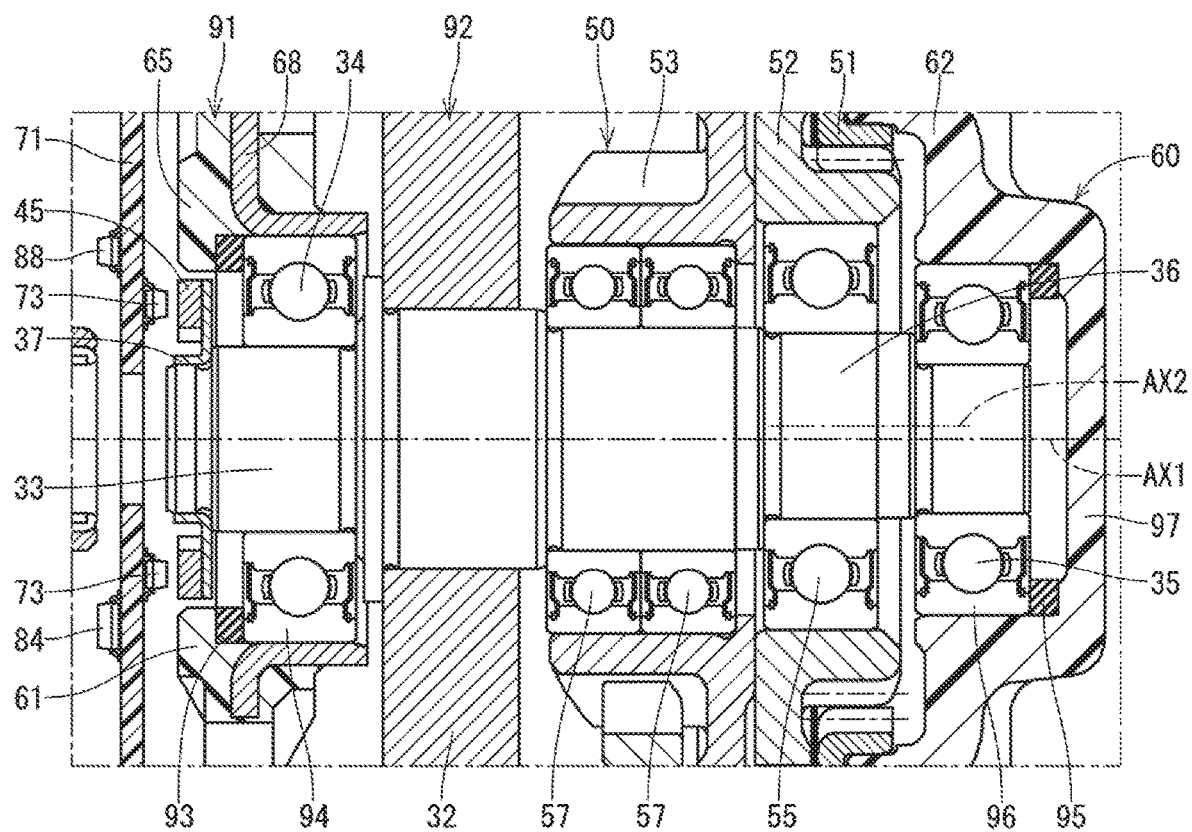
FIG. 6 is a partially enlarged cross-sectional view of a rotary actuator according to a third embodiment.

In the third embodiment, as shown in FIG. 6, the actuator 10 includes an elastic body 93 as a first biasing body and an elastic body 95 as a second biasing body. As with the first embodiment, the elastic body 93 biases the rotor assembly 92 toward the one side of the axial direction away from the control board 71 (i.e., the right side in FIG. 6). The elastic body 95 biases the rotor assembly 92 toward the other side of the axial direction toward the control board 71 (i.e., the left side in FIG. 6). In this way, by eliminating the thrust movement gap between the rotor assembly 92 and the housing 91 by both the elastic bodies 93 and 95, the same advantages as in the first embodiment can be obtained.

OTHER EMBODIMENTS

In another embodiment, the biasing member is not necessarily made of rubber, and may be made of another material. Further, the biasing member may be a spring such as a coil spring or a leaf spring. Further, the elastic body is not necessarily limited to an annular shape, and may be a disk shape or the like. A plurality of elastic bodies may be provided. Further, the biasing member may be provided between a fixing member and a rotating member, such as between the motor shaft and the housing.

In yet another embodiment, the control board may be fixed not only by heat caulking but also by another fixing means such as screw fastening, bonding, and press-fitting. Further, the control board is not necessarily limited to be fixed to the case, and may be fixed to a plate cover which is another part of the housing.

The present disclosure is not limited to the embodiments described above, and can be implemented in various forms without departing from the spirit of the invention.

The invention claimed is:

1. A rotary actuator used in a shift-by-wire system for a vehicle, the rotary actuator comprising:
    a motor;
    a controller that controls the motor;
    a housing that supports a rotor assembly of the motor and holds the controller; and
    a biasing member that biases the rotor assembly in an axial direction to eliminate a thrust movement gap between the rotor assembly and the housing, wherein
    the rotor assembly includes a rotor and a bearing that rotatably supports the rotor,
    the biasing member is disposed between an outer ring of the bearing and the housing, and
    the biasing member is in contact with both the outer ring and the housing to bias the rotor assembly.

2. The rotary actuator according to claim 1, wherein
    the biasing member is an elastic body that biases the rotor assembly toward one side or the other side of the axial direction.

3. The rotary actuator according to claim 1, wherein
    the biasing member includes:

a first elastic body that is configured to bias the rotor assembly toward the one side of the axial direction; and
a second elastic body that is configured to bias the rotor assembly toward the other side of the axial direction.

* * * * *